(12) United States Patent
Wilson et al.

(10) Patent No.: US 8,159,524 B2
(45) Date of Patent: Apr. 17, 2012

(54) ORTHORECTIFYING STITCHED OBLIQUE IMAGERY TO A NADIR VIEW, AND APPLICATIONS THEREOF

(75) Inventors: Randall Wilson, Albuquerque, NM (US); Charles C. Rhodes, Los Altos, CA (US); Andrew Kirmse, Redwood City, CA (US); Stephen D. Zelinka, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 299 days.

(21) Appl. No.: 12/591,113

(22) Filed: Nov. 9, 2009

(65) Prior Publication Data

US 2011/0109719 A1    May 12, 2011

(51) Int. Cl.
*H04N 15/00* (2006.01)
(52) U.S. Cl. .......................................... 348/42
(58) Field of Classification Search .............. 348/42–79
See application file for complete search history.

(56) References Cited

U.S. PATENT DOCUMENTS

2007/0237420 A1    10/2007    Steedly et al.
2011/0090337 A1*   4/2011    Klomp et al. ................. 348/144

FOREIGN PATENT DOCUMENTS

WO    WO 2008/028040 A2    3/2008

OTHER PUBLICATIONS

European Patent Office, Notification of Transmittal of the International Search Report and the Written Opinion of the International Search Authority, or the Declaration, mailed Feb. 16, 2011, International Appln. No. PCT/US2010/056013, and PCT—Written Opinion of the International Searching Authority, 8 pages.

"Bing Maps," http://en.wikipedia.org/wiki/Bing_Maps, 8 pages, Nov. 3, 2009.

Afek, Y. & Brand, A., "Mosaicking of Orthorectified Aerial Images," *PhEngRS* 64(2): 115-125, American Society for Photogrammetry and Remote Sensing, United States (Feb. 1998).

Chmiel, J., et al., "Orthorectification and geometric quality assessment of very high spatial resolution satellite imagery for Common Agricultural Policy purposes," *Proceedings of XXth International Archives of the Photogrammetry, Remote Sensing and Spatial Information Sciences* 35(Part B4): 6 pages, ISPRS, Istanbul, Turkey (2004).

Qin, Z., et al., "A Methodology for True Orthorectification of Large-Scale Urban Aerial Images and Automatic Detection of Building Occlusions Using Digital Surface Model," *IEEE 2003 International Geosciences and Remote Sensing Symposium, II*: 729-731, Toulouse, France, (Jul. 2003).

* cited by examiner

*Primary Examiner* — Tung Vo
(74) *Attorney, Agent, or Firm* — Sterne, Kessler, Goldstein & Fox PLLC

(57) ABSTRACT

An oblique photographic image is projected onto a three-dimensional model of terrain. Points are sampled from the projected photographic image at the intersection of the three-dimensional model of terrain and parallel rays extended from a virtual viewport having a nadir perspective. The sampled points are assembled into an orthorectified image. Finally, the orthorectified image or the sampled points are adjusted approximately according to a difference in tilt angle between a camera that captured the oblique photographic image and the viewport having the nadir perspective to generate a foreshortened orthorectified image. Each location in the foreshortened orthorectified image corresponds linearly to a corresponding location in a two-dimensional map.

23 Claims, 7 Drawing Sheets

ORTHORECTIFYING STITCHED OBLIQUE IMAGERY TO A NADIR VIEW, AND APPLICATIONS THEREOF

BACKGROUND

1. Field of the Invention

Embodiments of this invention generally relate to displaying oblique imagery.

2. Related Art

Photographers often take images of the Earth from altitude, such as from an aircraft. Such aerial photographs can be taken from different perspectives. For example, nadir photographs are taken from a camera oriented straight down towards the Earth. While nadir photographs offer advantages, their steep perspective limits what they capture. For example, nadir photographs often fail to capture the sides of buildings, primarily capturing their roofs.

Oblique photographs, on the other hand, are taken with cameras tilted relative to the surface of the Earth. Often, oblique photographs are tilted by approximately 45 degrees. In contrast to nadir images, oblique photographs capture the sides of buildings. For this reason, oblique photographs are often used, for example, in real estate applications.

In one example, oblique images are available from a BING maps service, available from Microsoft, Inc. The BING maps service has a feature referred to as "Bird's Eye View" that displays an oblique image from the viewport of the camera that captured the image. While this approach has advantages, there are at least two drawbacks. First, because images can only be shown one at a time, navigation between images is difficult. To navigate between images, the BING maps service fades one image out, and another nearby image fades in. Similarly, the BING maps service does not allow a user to zoom out to an area covered by more than one image. Second, overlaying map data, such as roads, is difficult, because the map data must be positioned in the coordinate space of each image. This requires a great deal of additional processing time and storage.

Systems and methods are needed better to display oblique imagery with overlaid map data.

BRIEF SUMMARY

Embodiments of this invention relate to orthorectifying oblique imagery to a nadir view. In an embodiment, a method orthorectifies oblique photographic imagery. In an embodiment, an oblique photographic image is projected onto a three-dimensional model of terrain. Points are sampled from the projected photographic image at the intersection of the three-dimensional model of terrain and parallel rays extended from a viewport having a nadir perspective. The sampled points are assembled into an orthorectified image. Finally, the orthorectified image or the sampled points are adjusted approximately according to a difference in tilt angle between a camera that captured the oblique photographic image and the viewport having the nadir perspective to generate a foreshortened orthorectified image. Each location in the foreshortened orthorectified image corresponds linearly to a corresponding location in a two-dimensional map.

In second embodiment, a system orthorectifies oblique photographic imagery. The system includes a projector module configured to project an oblique photographic image onto a three-dimensional model of terrain. A sampler module is configured to sample points from the projected photographic image. The points are located at the intersection of the three-dimensional model of terrain and parallel rays extended from a viewport having a nadir perspective. The sampler module is also configured to assemble the sampled points into an orthorectified image. A foreshortening module is configured to adjust the orthorectified image or the sampled points approximately according to a difference in tilt angle between a camera that captured the oblique photographic image and the viewport having the nadir perspective to generate a foreshortened orthorectified image. Each location in the foreshortened orthorectified image corresponds linearly to a corresponding location in a two-dimensional map.

In a third embodiment, a method orthorectifies oblique photographic imagery. In the embodiment, a point on a three-dimensional model of terrain is determined for each point in a nadir viewport. Each point is at the intersection of the three-dimensional model of terrain and parallel rays extended from the nadir viewport. Each point determined on the three-dimensional model is projected to a position of a camera model that took an oblique photographic image to sample a point on the oblique photographic image. The sampled points are assembled into an orthorectified image. The orthorectified image or the sampled points approximately according to a difference in tilt angle between a camera that captured the oblique photographic image and the viewport having the nadir perspective are foreshortened to generate a foreshortened orthorectified image. Each location in the foreshortened orthorectified image corresponds linearly to a corresponding location in a two-dimensional map.

Further embodiments, features, and advantages of the invention, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In general, embodiments of this invention relate to processing oblique imagery to display with map data. This Detailed Description is divided into sections. The first section describes orthorectifying oblique images according to an embodiment. The second section describes foreshortening and smoothing to correct distortions caused by the orthorectification. The third section describes assembling the corrected, orthorectified images into a mosaic and overlaying map data. The fourth section describes a system for orthorectifying stitched oblique imagery to a nadir view according to an embodiment. Finally, the fifth section describes a method for orthorectifying stitched oblique imagery to a nadir view according to an embodiment.

Orthorectification

Figures 1A, 1B:
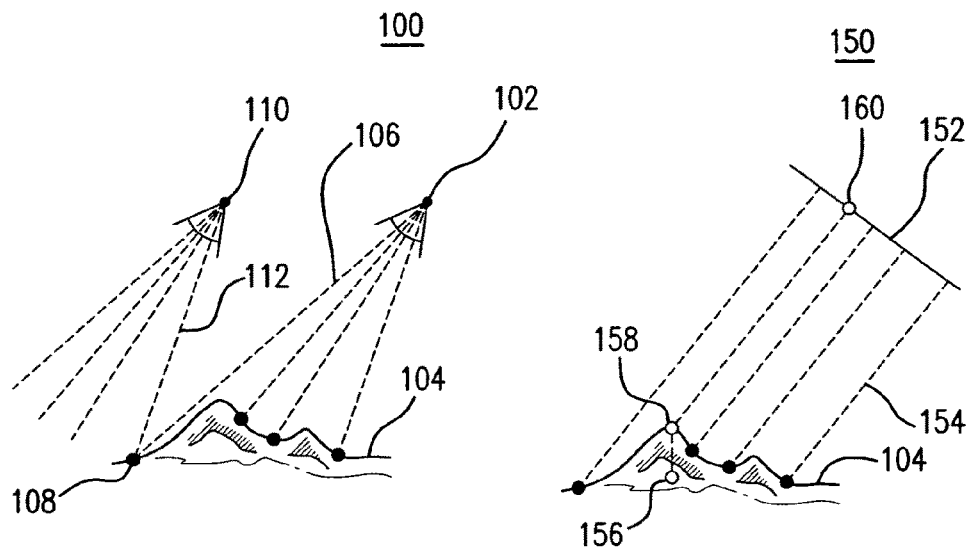
FIG. 1A is a diagram illustrating a camera positioned to capture oblique imagery.
FIG. 1B is a diagram illustrating orthorectifying oblique imagery using an oblique view.

FIG. 1A is a diagram 100 illustrating cameras 102 and 110 positioned to capture oblique photographs of a terrain 104. An oblique photograph is a photograph taken with a camera inclined between the horizontal and the vertical directions. In an embodiment, an oblique photograph may have a tilt of between 30-60 degrees from the vertical axis. In a further embodiment, an oblique photograph may have an intended tilt of approximately 45 degrees from the vertical axis, but may vary from the 45 degree tilt due to, for example, variations in movement of the aircraft, imprecisions in orienting the camera, etc.

In embodiments, oblique photographs may not be limited to the visual spectrum. In an example, the photograph may be a multi-spectrum image, such as an image generated by an infrared sensor. In another example, the photograph may be an image generated using a laser rangefinder.

In an example, each oblique photograph may cover several city blocks. To cover an entire city, a large number of oblique photographs may be taken. However, each photograph may be taken from a different perspective. For example, cameras 102 and 110 both capture a point 108 of terrain 104. However, cameras 102 and 110 capture point 108 from different perspectives, as indicated by the fact that ray lines 112 and 106 are at different angles.

To display the photographs taken from cameras 110 and 102 together in a map, the photographs need to be adjusted to have a consistent perspective. This adjustment is referred to as orthorectification. FIG. 1B is a diagram 150 illustrating orthorectifying oblique imagery using an oblique viewport 152. Effectively, the photographs are projected onto a three-dimensional model of terrain 104 by a computing device. The computing device samples points of the projected image from a virtual viewport having an oblique view. Each point sampled is located at the intersection of a parallel ray from the oblique viewport and the three-dimensional model of terrain 104. In this way, the oblique photographs are adjusted to have a consistent perspective.

Orthorectifying oblique images to an oblique view results in little or no distortion. But, it is difficult to overlay map data on the orthorectified oblique images. Map data is data geocoded to a location on a map. In examples, map data may include roads, cities, place names, points of interest, borders, panoramic street view images, and user generated content in, for example, Keyhole Markup Language. Often map data is geocoded using two-dimensional coordinates, such as latitude and longitude. But, to determine its location on the orthorectified oblique image, the location of the map data in three-dimensional space must be determined.

Diagram 150 illustrates an example. In the example, an element of map data (such as a road) is geocoded at latitude-longitude coordinates corresponding to a point 156. To position the road on the orthorectified oblique image, a computing device has to determine an altitude of the road using a three-dimensional model of terrain 104. The resulting three-dimensional coordinate (latitude, longitude, and altitude) is illustrated by a point 158. Finally, the computing device has to project point 158 onto oblique viewport 152 to determine the road's position on the orthorectified oblique image, as illustrated by a point 160. This computation may be burdensome on computing resources, such as processing power and memory.

Figure 2:
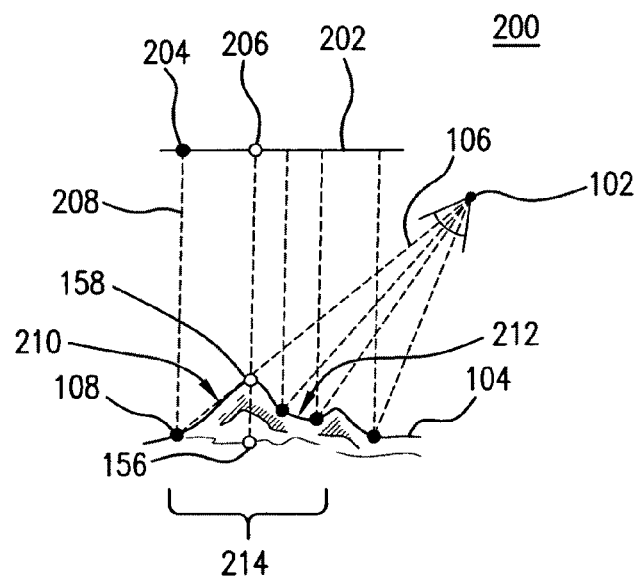
FIG. 2 is a diagram illustrating orthorectifying oblique imagery using a nadir view according to an embodiment of the present invention.

To avoid this burdensome computation, embodiments of this invention orthorectify oblique imagery to a nadir view as illustrated in FIG. 2. FIG. 2 shows a diagram 200 illustrating orthorectifying oblique imagery taken from camera 102 to a nadir view 202. Similar to FIG. 1B, oblique photographs are projected onto a three-dimensional model of terrain 104 by a computing device. However, instead of sampling from an oblique view, the projected image is sampled from nadir view 202. Each sampled point extends from a parallel ray (such as a ray 208) extending from nadir view 202. For example, point 108 on the projected image appears at point 204 on the orthorectified image.

For clarity, embodiments are described with respect to first projecting the oblique image onto the three-dimensional terrain to determine a set of points, such as a point 108, and then sampling those points onto the nadir view. But, a person of skill in the art would recognize that the order of those steps may be reversed for the same or similar results. For example, to determine the pixel at point 204 on viewport 202, ray 208 is extended to determine intersection point 108 on terrain 104. Intersection point 108 is projected back to the position of camera 106 along ray 106 to sample a corresponding point from the oblique orthographic image.

While projecting oblique imagery onto a nadir view may introduce some distortion, it also makes it easier to overlay map data. Since the nadir view is oriented straight down towards the earth, altitude of map data is irrelevant to determining the position of the map data to the orthorectified image. Effectively, each location in a two-dimensional map corresponds linearly to a corresponding location in the orthorectified image.

Diagram 200 illustrates an example. As in FIG. 1B, point 156 corresponds to an element of map data (such as a road) geocoded at latitude-longitude coordinates. To determine where to position point 156 on the orthorectified image, a computing device may project point 156 onto nadir view 202 to determine point 206. As altitude is irrelevant, there may be no need to use terrain 104 to determine a point 158. Effectively, the latitude-longitude coordinates of point 206 correspond linearly to its position in the orthorectified image. This linear computation may be less burdensome on computing resources, such as processing power and memory.

The three-dimensional model of terrain 104 may be a three-dimensional model of the Earth. The three-dimensional model may include geographic formations such as hills and mountains. The model may further include other natural and man made features, such as buildings. In other embodiments, terrain include smaller scale objects such as furniture and store display shelves. In examples, terrain 104 may be represented in various ways as would be known to those of skill in the art. In a first example, terrain 104 may be modeled as a triangular mesh of three dimensional points. In a second example, terrain 104 may be modeled as a two dimensional array where each array element has an elevation value. FIG. 2 is further described below, particularly with respect to a hill 214 in terrain 104.

Foreshortening and Smoothing

While orthorectifying nadir imagery to an oblique view may result in easier computation to overlay map data, the resulting imagery may be distorted. In one example, the orthorectified image may be elongated in the virtual direction due to the difference in tilt between the oblique imagery and nadir view. To correct for the elongation, the imagery may be foreshortened.

Figure 3:
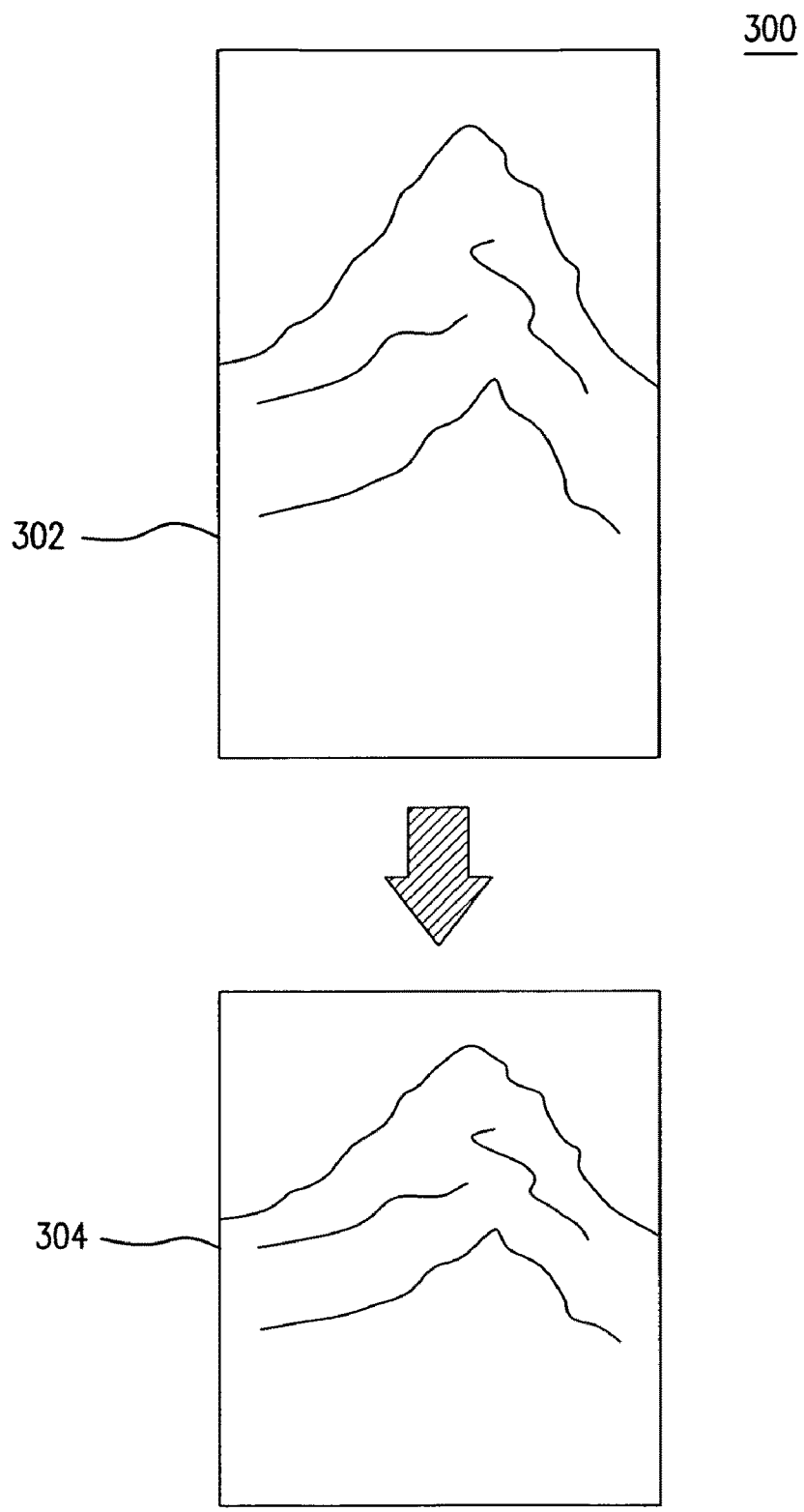
FIG. 3 is a diagram illustrating foreshortening imagery according to an embodiment.

FIG. 3 is a diagram 300 illustrating foreshortening imagery according to an embodiment. Diagram 300 shows an elongated image 302. When elongated image 302 is reduced in the vertical direction, it may appear as foreshortened image 304. As the oblique imagery is taken at a shallower angle (the camera gets closer to being parallel with the ground), the resulting orthorectified image may be more elongated. As a result, more foreshortening may be required. Conversely, as the oblique imagery is taken at a steeper angle (the camera gets closer to pointing straight at the ground), the resulting orthorectified image may be less elongated, requiring less foreshortening.

A person of skill in the art would recognize that, in many embodiments, there may be little or no variation in the viewing angle of the camera between different oblique images in a set of oblique images. In those embodiments, the degree to which the image may be foreshortened may be set to a fixed value. But, the fixed value may still correspond to an approximate or intended viewing angle of the camera. Where the angle of an orthographic viewing plane (such as viewport 152 in FIG. 1B) is different then the intended viewing angle of the camera, the angle of the orthographic viewing plane may be used to determine the foreshortening factor.

In an embodiment, the image may be reduced in the vertical direction by a factor of $1/\sin(\theta)$ (i.e. $\sec(\theta)$), where $\theta$ is the angle between the orientation of the camera and the surface of the Earth. In this example, $\theta$ would be 90 degrees when the camera is facing straight down, and $\theta$ would be 0 degrees when the camera is parallel to the ground. Oblique imagery is often taken at around 45 degrees. Thus, the image may be reduced in the vertical direction by a factor of $1/\sin(45°)$, or $\sqrt{2}$—about 1.414. Put another way, elongated image 302 has approximately 1.414 times as many pixels in the vertical direction as foreshortened image 304. In an example, oblique imagery may be taken from a range of different perspectives, such as a range from 30 degrees to 60 degrees between the direction of the camera and the surface of the Earth. When a camera is at 60 degrees (the camera is facing closer to straight down toward the Earth), the foreshortening factor may be) $1/\sin(60°$ or about 1.154. When a camera is at 30 degrees (the camera is facing more toward the horizon), the foreshortening factor may be) $1/\sin(30°$ or 2.

As would be recognized by a person of ordinary skill in the art, there are a number of different ways to generate foreshortened image 304. In one embodiment, a computing device may shrink the orthorectified image in the vertical direction by the factor discussed above. In another embodiment, when conducting the sampling during the orthorectification process (as discussed above with respect to FIG. 2), a computing device may sample more frequently in the horizontal direction than in the vertical direction. For example, the computing device may sample approximately 1.414 times more frequently in the horizontal direction than in the vertical direction.

In a further embodiment, the image may be foreshortened approximately according to the difference in tilt. In this embodiment, the different in tilt may be, for example, the difference between the nadir view and an intended tilt of a camera. For example, the intended tilt of the camera may be approximately 45 degrees, but may vary due to, for example, variations in movement of the aircraft, imprecision in orienting the camera, etc. In an example, the camera tilt may vary up to 10-15 degrees.

By foreshortening the image in this way, elongation caused by a difference in tilt between the oblique images and the nadir view may be corrected.

In addition to the elongation caused by a difference in tilt, variations in the terrain model may cause a warping effect in the orthorectified image. Referring back to FIG. 2, diagram 200 illustrates a terrain 104 with hill 214. Due to the angle of camera 102, a far side 210 of hill 214 only occupies a small portion of the field of view of camera 102. However, once orthorectified, far side 210 of hill 214 occupies a much larger portion of nadir view 202. Similarly, a near side 212 of hill 214 occupies a large portion of the field of view of camera 102. However, once orthorectified, near side 212 of hill 214 occupies a much smaller portion of nadir view 202. In this way, variations in terrain can cause a warping effect in the orthorectified image.

As mentioned above, oblique images are particularly useful in areas where there are a lot of buildings, such as cities. Cities are generally built in relatively flat areas. In these areas, the amount of warping caused by variations in terrain may be acceptable or difficult to notice. However, one way to correct for the warping is to smooth the terrain prior to orthorectification.

Figure 4:
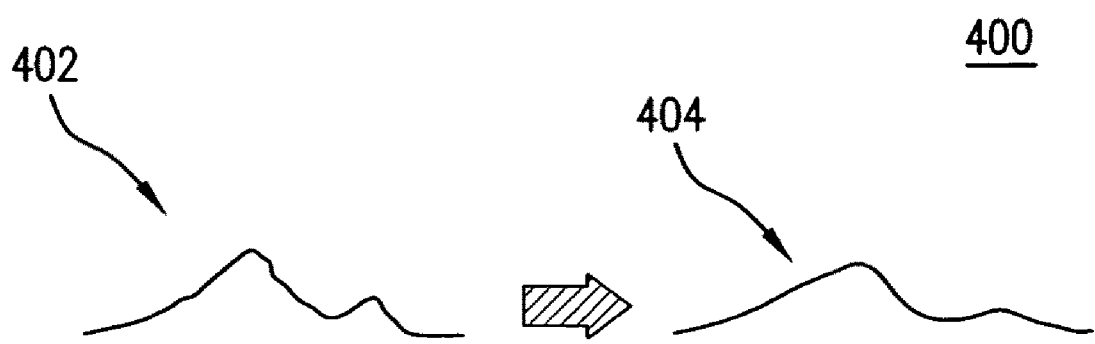
FIG. 4 is a diagram illustrating smoothing terrain according to an embodiment.

FIG. 4 is a diagram 400 illustrating smoothing the terrain model according to an embodiment. Diagram 400 shows a terrain 402. Once terrain 402 is smoothed, it may appear as smoothed terrain 404. Smoothing may be accomplished through various methods known to those of skill in the art. For example, smoothed terrain 404 may be determined by convolving terrain 402 with a Gaussian filter. In a second embodiment, mesh domain smoothing may be applied to terrain 402. In another example, a box filter algorithm, such as a 100 or 200-meter box filter, may be applied to terrain 402 to determine smoothed terrain 404. In embodiments, terrain 402 may be smoothed such that no slope is steeper than 20 degrees. Once determined, smoothed terrain 404 is used in the orthorectification process described above with respect to FIG. 2. Smoothing the terrain model may make the model less accurate in that it may resemble the real model less. However, despite being less accurate, the resulting image may be more visually appealing.

Figure 5A:
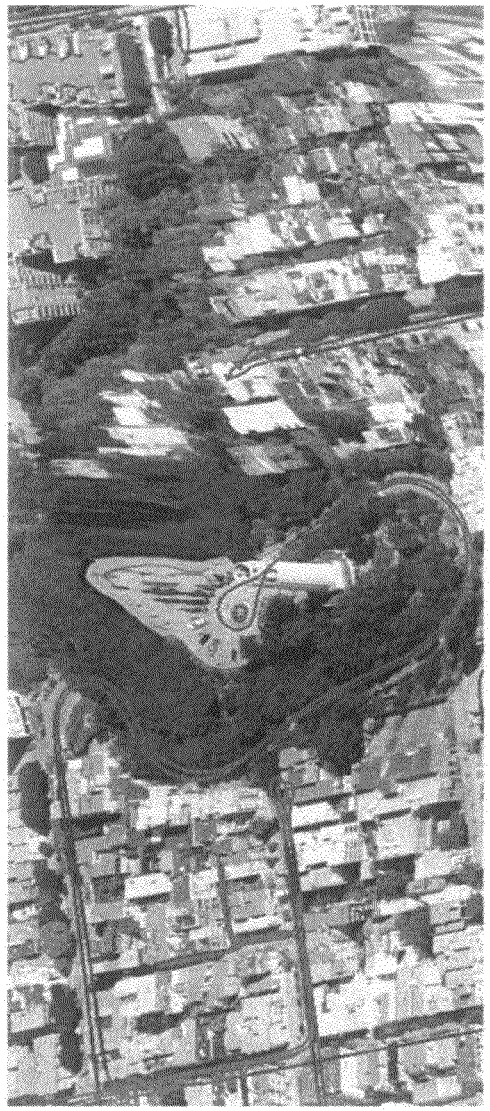
FIG. 5A is a diagram illustrating an example image of steep terrain orthorectified to a nadir view without the smoothing illustrated in FIG. 4.
Figure 5B:
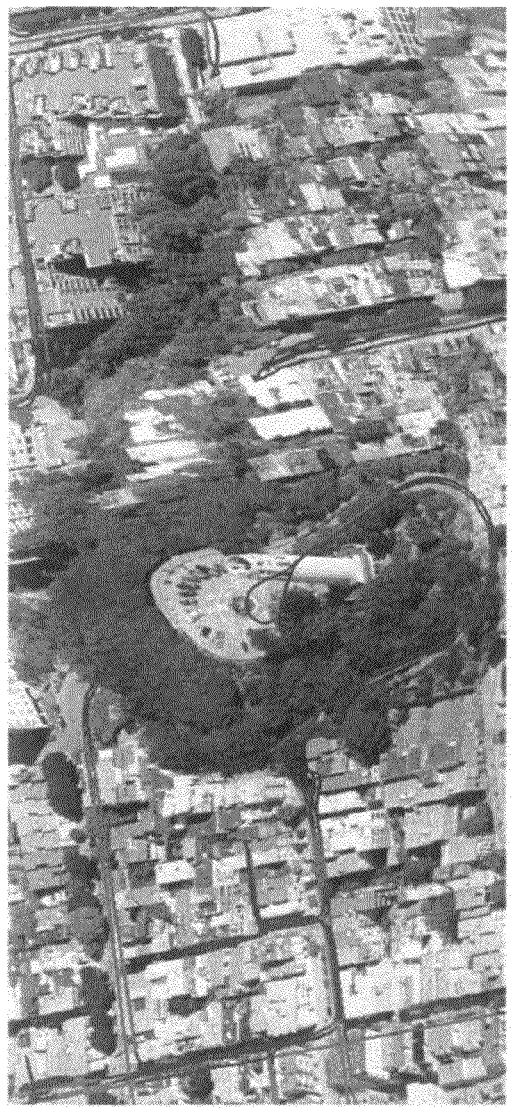
FIG. 5B is a diagram illustrating an example image of steep terrain orthorectified to a nadir view with the smoothing illustrated in FIG. 4.

FIGS. 5A-B show an example of how smoothing can reduce the warping effects due to variations in terrain. FIG. 5A is a diagram 500 illustrating an orthorectified photograph of Telegraph Hill, a steep hill in San Francisco, Calif. The oblique photograph has been orthorectified to a nadir view to according to the process described with respect to FIG. 2. Due to the variations in terrain, the far side of Telegraph Hill is stretched.

FIG. 5B is a diagram 550 an orthorectified photograph of Telegraph Hill generated with the smoothed terrain as described above with respect to FIG. 4. The resulting image has less warping and may be more visually appealing than the image in FIG. 5A.

By foreshortening imagery and smoothing the terrain model, embodiments can correct some of the distortions introduced by orthorectifying oblique imagery to a nadir view.

Mosaicking and Overlaying

Once the oblique imagery is orthorectified to a nadir view and any distortions are corrected, an image mosaic may generated. In an alternative embodiment, the image mosaic may be generated before foreshortening. In that embodiment, the foreshortening may be applied to the mosaicked images. The image mosaic includes a plurality of image tiles that can be stitched together to produce a larger image. The image mosaic can be generated based on the corrected, orthorectified images using, for example, a graph cut algorithm or other algorithms known to those of ordinary skill in the art. Map data can be overlaid on the image mosaic as illustrated in FIG. 6.

Figure 6:
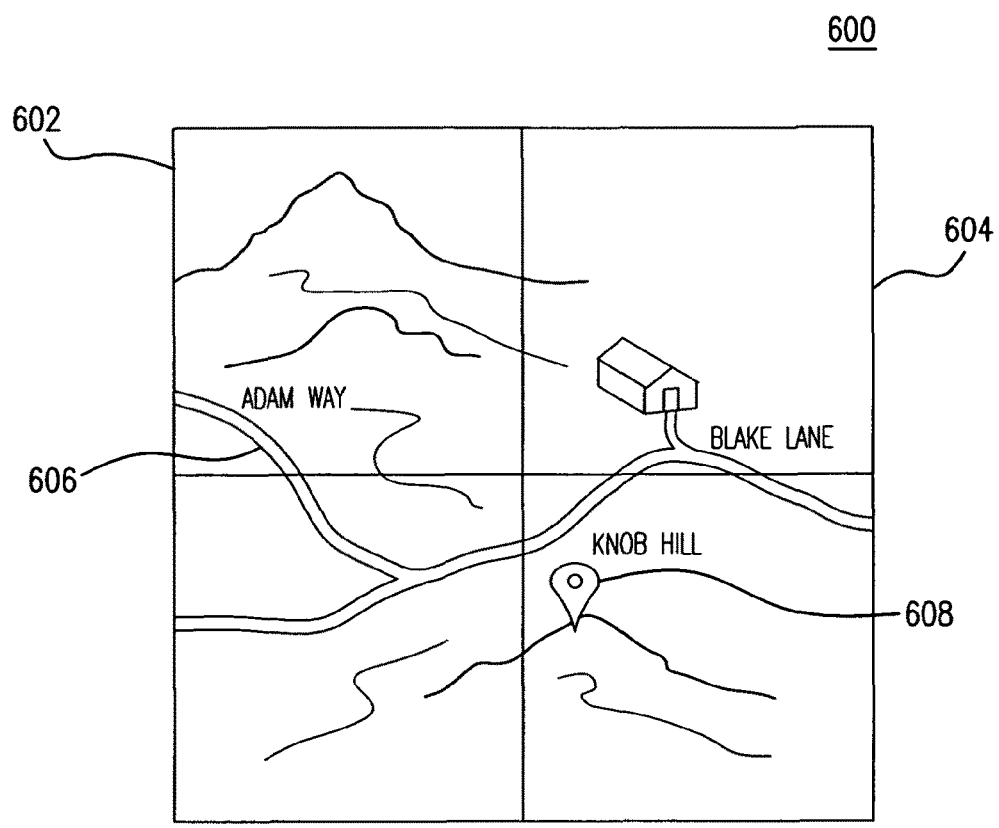
FIG. 6 is a diagram illustrating an oblique image mosaic with overlaid map data according to an embodiment.

FIG. 6 is a diagram 600 illustrating an oblique image mosaic with overlaid map data according to an embodiment. Diagram 600 shows an image mosaic with a plurality of image tiles, including image tiles 602 and 604. Overlaid on portions of the image mosaic is map data. The map data includes a variety of elements. Each element is geocoded with a coordinate, such as a latitude and longitude. The elements shown in diagram 600 include a road 606 and a point of interest 608.

How road 606 and point of interest 608 are positioned may depend on which map projection used. For example, a Google Maps service uses a Mercator projection. To determine where to position map data in a Mercator projection based on a latitude and longitude, a well-known function may be applied. To determine where to place road 606 and point of interest 608 on the image mosaic, a computing device may only need to execute a simple linear function on the map positions associated with road 606 and point of interest 608. For example, if the imagery was captured at approximately 45 degrees and is intended to be viewed from an angle of 45 degrees, the vertical position of a point of interest on the imagery corresponds to its vertical position on a normal Mercator projection map divided by approximately 1.414. This linear correspondance obviates the need to take into account the height of the terrain when determining the position of an overlaid map feature. In this way, map data may be overlaid onto the orthorectified images more easily.

Further details on mosaicking and overlaying are provided below with respect to FIGS. 7-8.

System

Figure 7:
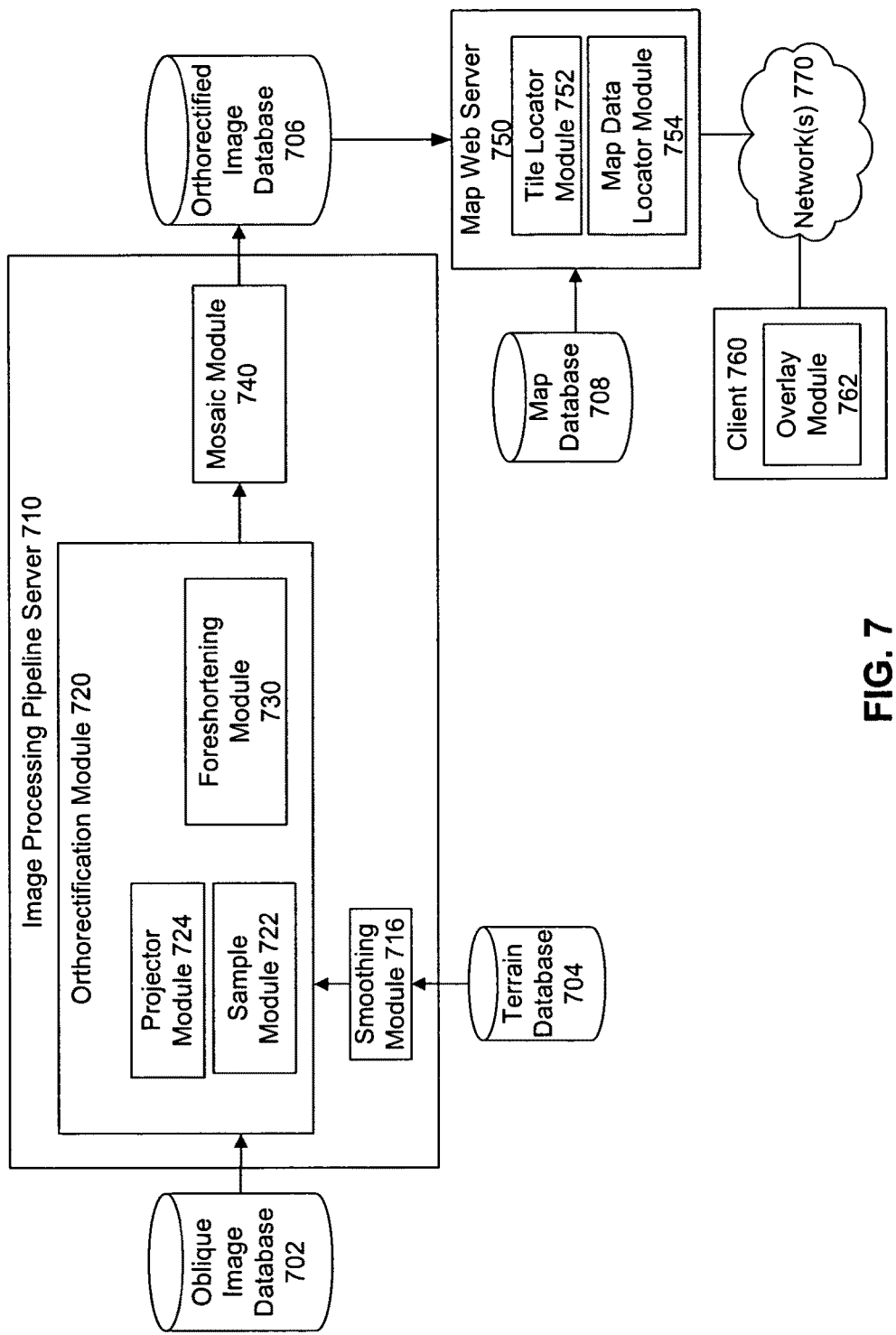
FIG. 7 is an architecture diagram illustrating a system for orthorectifying stitched oblique imagery to a nadir view according to an embodiment.

FIG. 7 is a diagram illustrating a system 700 for orthorectifying stitched oblique imagery to a nadir view according to an embodiment. System 700 includes an image processing pipeline server 710 coupled to an oblique image database 702, a terrain database 704, and an orthorectified image database 706. Image processing server 710 includes a smoothing module 716, an orthorectification module 720, and a mosaic module 740. Orthorectified image database 706 is also coupled to a map web server 750, which is coupled to a map database 708. Map web server 750 is coupled to a client 760 via one or more networks 770, such as the Internet.

In general, system 700 may operate as follows. Smoothing module 716 retrieves a three-dimensional model of terrain from terrain database 704. Smoothing module 716 smoothes the terrain and sends the smoothed terrain to orthorectification module 720. Orthorectification module 720 retrieves a plurality of images from oblique image database 702. Orthorectification module 720 orthorectifies the oblique images to a nadir view and foreshortens the imagery. Mosaic module 740 receives the orthorectified, foreshortened images and constructs an image mosaic. The image mosaic is stored in orthorectified image database 706. In response to a request, map web server 750 retrieves map tiles from orthorectified image database 706 and map data from map database 708. Map web server 750 may overlay the map data onto the map tiles. Alternatively, map web server 750 may send the map data and map tiles to client 760, and client 760 may conduct the overlay. Finally, client 760 displays the map tiles and overlaid map data to a user. Each of the components and their operation is described in greater detail below.

As mentioned above, smoothing module 716 is configured to retrieve a three-dimensional model of terrain stored in terrain database 704. For example, the three-dimensional model may be a three-dimensional model of the Earth. The three-dimensional model may include geographic formations such as hills and mountains. The model may further include other natural and man made features, such as buildings. In other embodiments, terrain include smaller scale objects such as furniture and store display shelves.

Once the three-dimensional terrain is retrieved, smoothing module 716 is configured to smooth the three-dimensional model of terrain. Smoothing module 716 may smooth the terrain model as described above with respect to FIGS. 4 and 5A-B. In embodiments, smoothing module 716 may smooth the terrain using a moving average or a box-filter algorithm. As mentioned above, smoothing the terrain model in this way may help avoid some warping caused by variations in terrain in the resulting orthorectified images.

Orthorectification module 720 may retrieve a plurality of oblique images from oblique image database 702 and may instruct its sub-modules to process each of the oblique images to produce a plurality of orthorectified, foreshortened images. Orthorectification module 720 includes a projector module 724, sample module 722 and a foreshortening module 730.

Projector module 724 is configured to project an oblique photographic image onto a three-dimensional model of terrain, such as the smoothed three-dimensional model of terrain. Sampler module 722 is configured to sample points from the projected photographic image from a virtual viewport having a nadir perspective. The points are located at the intersection of the three-dimensional model of terrain and parallel rays extended from the viewport. Sampler module 722 is also configured to assemble the sampled points into an orthorectified image. Projector module 724 and sampler module 722 may operate as described above with respect to FIG. 2 to orthorectify oblique imagery to a nadir view.

As described above, the difference in tilt between the oblique imagery and the nadir view may cause elongation. Foreshortening module 730 is configured to foreshorten the imagery to correct for this elongation. Foreshortening module 730 may operate as described with respect to FIG. 3. In an embodiment, foreshortening module 730 may shrink the orthorectified image in the vertical direction. Foreshortening module 730 may shrink the orthorectified image by a factor corresponding to a difference in a tilt angle between the oblique photographic image and the nadir viewport used in orthorectification. In one example, the orthorectified image may be shrunk in the vertical direction by a factor of approximately $\sqrt{2}$.

In another embodiment, foreshortening module 730 may adjust the points sampled by sample module 722 during orthorectification. Foreshortening module 730 may adjust the points sampled such that sample module 722 samples points more frequently in the horizontal direction than in the vertical direction. In an example, the number of points sampled in the horizontal direction is approximately $\sqrt{2}$ times the number of points sampled in the vertical direction. In this way, foreshortening module 730 corrects for the elongation effects caused by a difference in tilt between the oblique imagery and the nadir view.

Mosaic module 740 receives the orthorectified, foreshortened images from orthorectification module 720. Mosaic module 740 is configured to determine a mosaic of orthorectified images based on the foreshortened, orthorectified images. In an embodiment, mosaic module 740 may use a graph cut algorithm to determine the mosaic. The mosaic of orthorectified images includes a plurality of image tiles that can be stitched together to form a larger image. Mosaic module 740 stores the mosaic into orthorectified image database 706.

Map web server 750 may, for example, be an HTTP server that responds to an HTTP request with an HTTP response. Map web server 750 includes a tile locator module 752 and a map data locator module 754. Tile locator module 752 is configured to identify an orthorectified image tile from the mosaic of orthorectified images in response to a request. In an example, the request may include a location value, and tile locator module 752 may identify an orthorectified image tile in orthorectified image database 706 that corresponds linearly to that location value.

Map data locator module 754 is configured to identify map data in response to a request. In an example, the request may include a location value, and map data locator module 754 may identify map data in map database 708 geocoded at the location. In an embodiment not shown, map web server 750 may overlap the map data onto the image tile. Alternatively, tile locator module 752 and map data locator module 754 sends the identified image tile and map data to client 760 via one or more network(s) 770 to overlay the map data.

In an embodiment, client 760 is configured to receive an orthorectified image tile and map data from map web server 750. Client 760 includes an overlay module 762 configured to overlay the map data on the orthorectified image tile. Overlay module 762 determines a position in the orthorectified image tile for each element of the map data by applying a linear function to the element's corresponding coordinate. Finally, client 760 may display the map data overlaid on the orthorectified image tile to a user as illustrated in FIG. 6. In this way, map data may be overlaid onto oblique images with a simple linear function.

Each of smoothing module 716, sample module 722, projector module 724, foreshortening module 730, orthorectification module 720, mosaic module 740, tile locator module 752, map data locator module 754, and overlay module 762 may be implemented on hardware, software, firmware or any combination thereof.

Each of oblique image database 702, terrain database 704, orthorectified image database 706, and map database 708 may be any type of structured memory, including a persistent memory. In examples, each database may be implemented as a relational database.

Each of image processing pipeline server 710, map web server 750, and client 760 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Method

Figure 8:
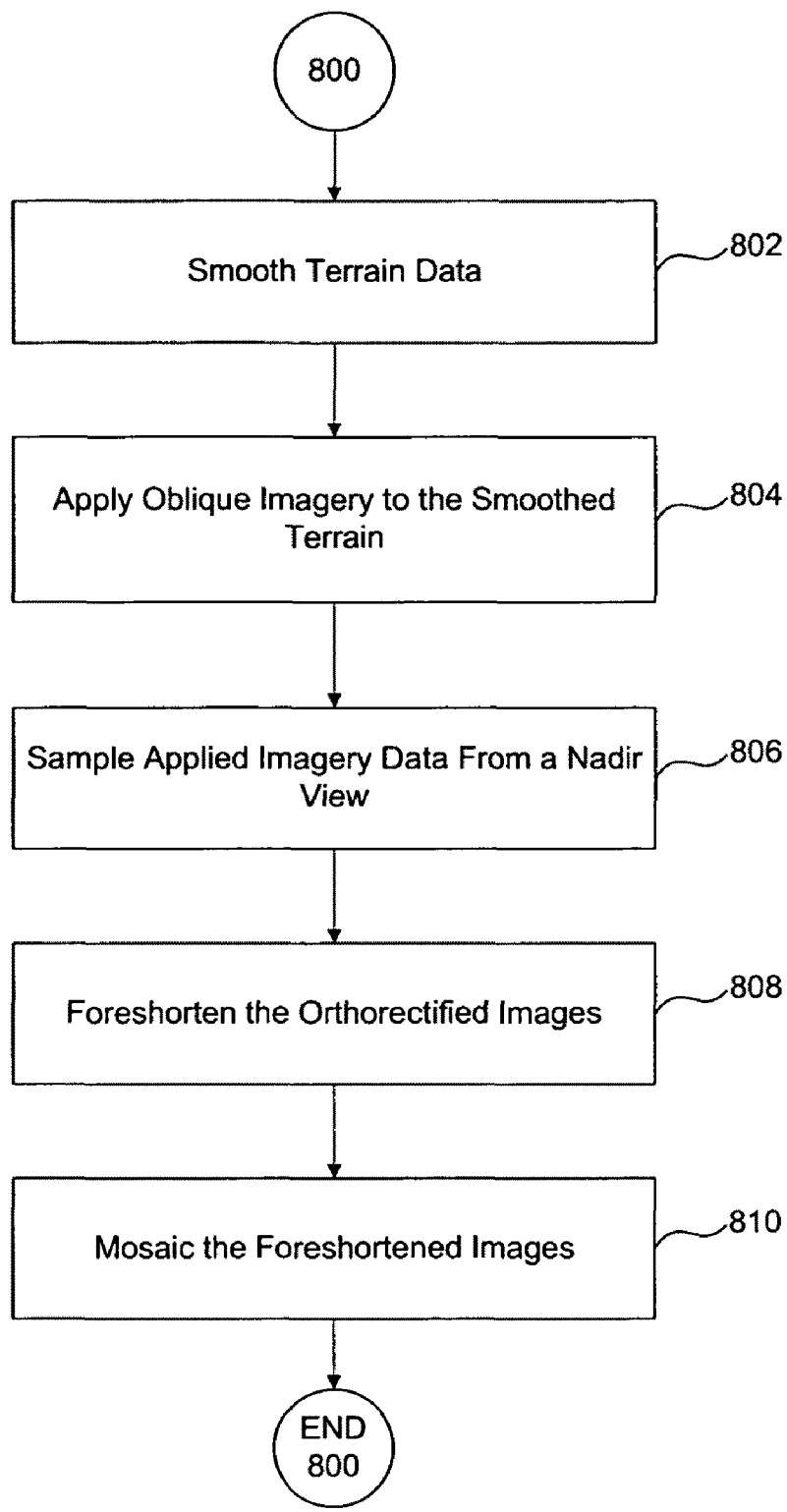
FIG. 8 is a flowchart illustrating a method for orthorectifying stitched oblique imagery to a nadir view according to an embodiment.

FIG. 8 is a flowchart illustrating a method 800 for orthorectifying stitched oblique imagery to a nadir view according to an embodiment. In an example, method 800 may be used in operation of system 700 in FIG. 7.

The method begins by smoothing terrain data at step 802. The smoothing may operate as described above with respect to FIGS. 4 and 5A-B. In an example, the smoothing may include applying a box filter algorithm to the terrain model.

Steps 804 and 806 conduct the orthorectification. At step 804, an oblique photographic image is projected onto the terrain model, such as the smoothed model from step 802. At step 806, points of the projected photographic image are sampled from a virtual viewport having a nadir perspective. The points are sampled from the intersection of the terrain model and parallel rays extended from the viewport. Finally, the points may be assembled into an orthorectified image. Steps 804 and 806 may operate as described above with respect to FIG. 2. In this way, oblique images are orthorectified to a nadir view.

At step 808, the imagery is foreshortened to adjust for elongation due to the difference in tilt between the oblique images and the nadir view. The foreshortening may operate as described above with respect to FIG. 3. In an embodiment, the orthorectified image may be shrunk in the vertical direction. The orthorectified image may be shrunk in the vertical direction by a factor corresponding to a difference in a tilt angle between the oblique imagery and the nadir viewport to generate a foreshortened orthorectified image. In an example, the orthorectified image is shrunk in the vertical direction by a factor of approximately the square root of two.

In another embodiment, the imagery may be foreshortened by adjusting the sampling points used in orthorectification. The sampling in step 806 may be conducted such that points are sampled more frequently in the horizontal direction than in the vertical direction. In an example, the number of points sampled in the vertical direction times the square root of two is approximately equal to the number of points sampled in the horizontal direction.

Finally, at step 810, the orthorectified, foreshortened images are used to determine a mosaic of orthorectified images. In an example, the mosaic may be determined using a graph cut algorithm.

In this way, a mosaic of oblique images is created that corresponds linearly to a two-dimensional map.

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for orthorectifying oblique photographic imagery, comprising:
   (a) projecting an oblique photographic image onto three-dimensional model of terrain;
   (b) sampling points of the projected photographic image from a viewport having a nadir perspective, the points being at the intersection of the three-dimensional model of terrain and parallel rays extended from the viewport;
   (c) assembling the sampled points into an orthorectified image; and
   (d) adjusting the orthorectified image or the sampled points approximately according to a difference in tilt angle between a camera that captured the oblique photographic image and the viewport having the nadir perspective to generate a foreshortened orthorectified image,
   wherein each location in the foreshortened orthorectified image corresponds linearly to a corresponding location in a two-dimensional map.

2. The method of claim 1, wherein the adjusting (d) comprises shrinking the orthorectified image in the vertical direction.

3. The method of claim 2, wherein the shrinking comprises shrinking the orthorectified image in the vertical direction by a factor between 1.154 to 2.0 inclusive.

4. The method of claim 1, wherein the adjusting (d) comprises adjusting the sampling points such that points are sampled more frequently in the horizontal direction than in the vertical direction.

5. The method of claim 4, wherein the distance between points sampled in the horizontal direction times a factor is approximately equal to the distance between points sampled in the vertical direction, wherein the factor is between 1.154 to 2.0 inclusive.

6. The method of claim 1, further comprising:
   (e) prior to the projecting (a), smoothing the three-dimensional model of terrain,
   wherein the projecting (a) comprises projecting the oblique photographic image onto the smoothed three-dimensional model of terrain.

7. The method of claim 6, wherein the smoothing (e) comprises applying a box filter algorithm to the three-dimensional model of terrain.

8. The method of claim 1, wherein the oblique photographic image is an aerial image of the Earth, and
   wherein the three-dimensional model of terrain is a three-dimensional model of the Earth.

9. The method of claim 1, further comprising:
   (e) repeating (a)-(c) for each of a plurality of oblique photographic images to determine a plurality of orthorectified images; and
   (f) determining a mosaic of orthorectified images based on the plurality of orthorectified images using a graph cut algorithm.

10. The method of claim 1, further comprising:
    (e) overlaying map data onto at least a portion of the foreshortened orthorectified image, wherein each element of the map data is positioned at a location on the foreshortened orthorectified image that corresponds linearly to a corresponding location of the element of the map data.

11. The method of claim 10, wherein the map data comprises road data.

12. A system for orthorectifying oblique photographic imagery, comprising:
    a projector module configured to project an oblique photographic image onto three-dimensional model of terrain; and
    a sampler module configured to:
        sample points from the projected photographic image from a viewport having a nadir perspective, the points being located at the intersection of the three-dimensional model of terrain and parallel rays extended from the viewport, and
        assemble the sampled points into an orthorectified image; and
    a foreshortening module configured to adjust the orthorectified image or the sampled points approximately according to a difference in tilt angle between a camera that captured the oblique photographic image and the viewport having the nadir perspective to generate a foreshortened orthorectified image,
    wherein each location in the foreshortened orthorectified image corresponds linearly to a corresponding location in a two-dimensional map.

13. The system of claim 12, wherein the foreshortening module is configured to shrink the orthorectified image in the vertical direction.

14. The system of claim 13, wherein the foreshortening module is configured to shrink the orthorectified image in the vertical direction by a factor between 1.154 to 2.0 inclusive.

15. The system of claim 12, wherein the foreshortening module is configured to adjust the sampling points such that points are sampled more frequently in the horizontal direction than in the vertical direction.

16. The system of claim 15, wherein the number of points in the vertical direction times a factor is approximately equal to the number of points sampled in the horizontal direction, wherein the factor is between 1.154 to 2.0 inclusive.

17. The system of claim 12, further comprising:
    a smoothing module configured to smooth the three-dimensional model of terrain,
    wherein the projector module is configured to project an oblique photographic image onto the smoothed three-dimensional model of terrain.

18. The system of claim 17, wherein the smoothing module is configured to apply a box filter algorithm to the three-dimensional model of terrain.

19. The system of claim 12, wherein the oblique photographic image is an aerial image of the Earth.

20. The system of claim 12, further comprising:
    an orthorectification module configured to instruct the projector module and sampler module to repeatedly project and sample for a plurality of oblique photographic images to determine a plurality of foreshortened orthorectified images; and
    a mosaic module configured to determine a mosaic of orthorectified images based on the plurality of foreshortened orthorectified images using a graph cut algorithm.

21. The system of claim 20, further comprising:
a tile locator module that identifies an orthorectified image tile from the mosaic of orthorectified images corresponding to a location; and
a map data locator module that identifies map data corresponding linearly to the location.

22. The system of claim 21, wherein the map data comprises road data.

23. A method for orthorectifying oblique photographic imagery, comprising:
(a) determining a point on a three-dimensional model of terrain for each point in a nadir viewport, each point being at the intersection of the three-dimensional model of terrain and parallel rays extended from the nadir viewport;
(b) projecting each point determined in (a) to a position of a camera model that took an oblique photographic image to sample a point on the oblique photographic image;
(c) assembling the sampled points into an orthorectified image; and
(d) adjusting the orthorectified image or the sampled points approximately according to a difference in tilt angle between a camera that captured the oblique photographic image and the viewport having the nadir perspective to generate a foreshortened orthorectified image,
wherein each location in the foreshortened orthorectified image corresponds linearly to a corresponding location in a two-dimensional map.

* * * * *